Figure 1:
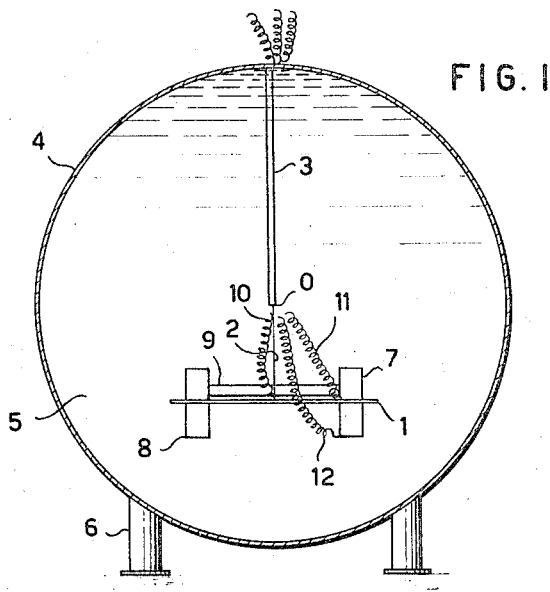

Dec. 27, 1966       P. J. RADEMAKERS       3,294,467
                    STABILIZATION SYSTEM
                    Filed Sept. 15, 1964

PETRUS JOHANNES RADEMAKERS
                    INVENTOR.

BY
                    ATTY.

United States Patent Office 3,294,467
Patented Dec. 27, 1966

3,294,467
STABILIZATION SYSTEM
Petrus J. Rademakers, Overveen, Netherlands, assignor to Laboratorium voor Instrumentatie Datawell N.V., Haarlem, Netherlands
Filed Sept. 15, 1964, Ser. No. 396,570
Claims priority, application Netherlands, Sept. 19, 1963, 298,085
6 Claims. (Cl. 312—351)

The invention relates to a stabilization system for supporting instruments.

In many technical fields it is of great importance, that instruments are mounted in a well stabilized way, so that oscillations of the base on which the instrument is mounted will not be transmitted to the instruments.

More specifically the invention aims at a stabilization system for instruments having an extremely low natural oscillating frequency.

Another object of the invention is to provide a stabilization system in which rotational movements, if any, from the base on which the system is mounted are not transmitted to the instruments or at least on a very reduced scale.

Still a further object of the invention is to provide a stabilization system, in which horizontal accelertaions will not manifest themselves in any rotational movement of the stabilized instruments.

According to the invention there is provided a stabilization system for an instrument having a vessel filled with liquid, a platform freely suspended inside that vessel and at least one instrument supported by that platform.

By reason of the fact that the platform and the instrument are submerged in a liquid, the platform and instrument will be submitted to an upwardly directed force reducing the force exerted by gravity on the platform and instrument. On the other side the liquid adhering to the platform and instrument to a great extent increases the inertial mass of platform and instrument. By reason of this gravitational forces are reduced whereas inertial mass is increased. Consequently the pendulum formed by the freely suspended platform with the instrument will have an extremely low natural frequency.

According to a further embodiment of the invention there is provided the stabilization system for an instrument having a vessel the inner surface of which is spherically shaped; rigid suspension means rigidly connected to the vessel and having a suspension point in the center of the sphere defined by the inner surface of the vessel; a flexible suspension means connected to the suspension point at the center of that sphere; an instrument support attached to said flexible suspension means and an instrument mounted on said support, the vessel being filled with a liquid.

Due to the fact that the vessel is spherically shaped at its inner side, rotational movements of the vessel will hardly be transmitted to the liquid inside the vessel, whereas such rotational movements will not change the position of the point of suspension of the flexible suspension means because this point is the center of the sphere.

In order to obtain a high stabilization there is provided a stabilization system as described, in which the density of the liquid is smaller than the sum of the weight of the instrument support and the instrument divided by the volume of the instrument support and the instrument by a small value. It is defined that a small value is less than 10% and preferably less than 1% of the density of the liquid.

Figure 2:
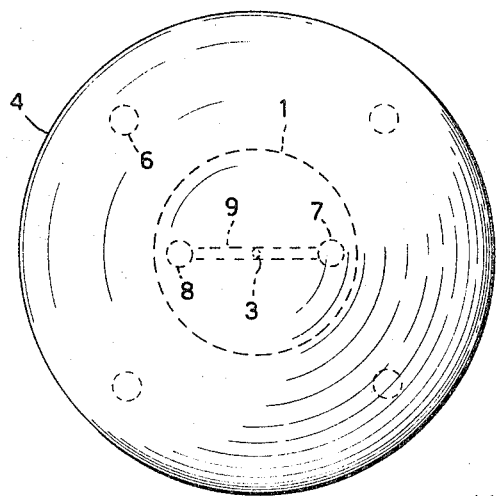

The invention will be described more fully with reference to the drawings, in which FIGURE 1 shows schematically an embodiment of the invention in elevation, whereas FIGURE 2 shows the same embodiment in plane view. In the drawing there is shown a stabilized platform 1 of circular shape that is suspended by means of a thin thread 2. This thread is connected to the center of the platform 1 and a suspension point 0 which is the center of the sphere formed by the inner surface of a vessel 4. This vessel is filled with a liquid 5. On the platform 1 there is mounted an instrument 7 with a dummy 8, which instruments are connected to each other by a tunnel 9. Electrical connections 10, 11 and 12 connect the instrument to the outside of the bulb 4. These connections 10, 11 and 12 are very flexible and may, for instance, consist of three copper wires having a diameter of about 1 to $5\mu$ and isolated by a very thin film of a suitable insulating material. In the embodiment shown the bulb is supported by four rigid supports 6. These supports may, for instance, be placed in a vessel, a buoy or a vehicle. Consequently all vertical motions of the vessel, buoy or vehicle will be transmitted to the instruments, whereas horizontal accelerations and rotational movements will not influence the orientation of the platform and the instruments with respect to the gravity field.

The instrument 7 and its dummy 8 preferably have exactly the same volume, the same position with respect to the center of the platform 1 and the same weight. Of course it is also possible to mount more than one instrument on the platform 1 in which case the instruments preferably are mounted such that the center of gravity of the volumes as well as the center of their weights will be in the vertical line through the center of the platform 1.

Of course the connecting point between the flexible thread 2 and the platform 1 is some small distance above the center of gravity of platform with instruments.

The bulb 4 is filled with a liquid 5 having a density such that the weight of the platform with instruments is almost, but not completely, balanced by the upwardly directed force due to the submergence in the liquid.

Due to the fact that the natural frequency of the pendulum formed by the platform 1 and its suspension 2 is proportional to $\sqrt{f/m}$, in which $f$ is the force exerted by gravity decreased by the upward force of the liquid and $m$ is the mass of platform, instruments and liquid adhering to platform and instruments, the natural frequency is very low if $f$ is small and $m$ is large. $m$ is about equal to the mass of the liquid sphere having the platform 1 as central plane. If the volume of platform and instruments is about 5% of the volume of the above indicated sphere and the density of the liquid is only 1% lower than is the weight of the platform and instruments divided by their volume, then the natural frequency of the system is increased by the filling with liquid by a factor of about $\sqrt{2000}$ or about 42. It is not difficult to obtain even considerably greater improvements in the natural frequency of the platform by choosing the density of the liquid very near to the quotient of weight and volume of platform and instruments.

Increasing the diameter of platform 1 will increase the sphere of liquid that can be considered to adhere to the platform. On the other hand a too great diameter of the platform leads to a situation in which the edge of the platform is very near to the inner surface of the bulb 4. In that instance rotational movements of the bulb 4 will be transmitted to the platform 1 by reason of the viscosity of the liquid.

Increasing the length of the thread 2 also will increase the natural frequency of the system, but in that instance too the platform 1 and the instruments 7 and 8 may come too near to the inner surface of bulb 4 so that again rotational movements of said bulb are transmitted to the platform.

It has been found that a very good stabilization is obtained if the length of the thread 2 between the center of the sphere defined by the inner surface of bulb 4 is between 30 and 65% of the radius of said sphere, whereas the largest diameter of the platform should be within 70 and 120% of the radius of said sphere.

If rotational oscillations with relatively high frequencies can be expected it is preferred to mount the bulb 4 in a universal joint casing (not shown), as is well known for damping such frequencies.

What I claim is:

1. Stabilization system for supporting an instrument comprising a vessel filled with a single liquid, a platform freely suspended inside said vessel by suspension means, the said platform and suspension means forming a type of pendulum which can freely move angularly with respect to said containing vessel, and at least one instrument supported by said platform.

2. Stabilization system for an instrument comprising a vessel the inner surface of which is spherically shaped; a rigid suspension means rigidly connected to the vessel and having a fixed suspension point in the center of the sphere defined by the inner surface of the vessel; a flexible fixed suspension means connected to the fixed suspension point at the center of said sphere; an instrument support attached to said flexible suspension means and an instrument mounted on said support, the vessel being filled with a single liquid, said flexible suspension means and said instrument support forming a type of pendulum which can freely move angularly with respect to said containing vessel.

3. Stabilization system according to claim 2 in which the density of the liquid is less than the weight of the instrument support and the instrument divided by the volume of the instrument support and the instrument by less than 10%.

4. Stabilization system according to claim 2 in which the density of the liquid is less than the weight of the instrument support and the instrument divided by the volume of the instrument support and the instrument by less than 1%.

5. Stabilization system comprising a vessel having a spherical inner surface, a single liquid inside the vessel, a support rod rigidly connected to the vessel and extending to the center of the sphere defined by the inner surface of the vessel; a flexible thread connected to the said rod in the center of the sphere; a platform supporting at least one instrument attached to the said flexible thread and very flexible electrical conductors leading from the instrument to the outside of the said vessel, the said platform and connecting thread forming a type of pendulum which can freely move angularly with respect to said containing vessel.

6. Stabilization system according to claim 5 in which the weight of the platform and the instrument or instruments supported by it divided by the volume of the platform and the instrument or instruments supported by it is a small value greater than the density of the liquid contained in said vessel, the distance between the center of the platform and the center of the sphere being within 30% and 65% of the radius of said sphere, whereas the largest diameter of the platform is within 70 and 120% of the radius of the said sphere.

References Cited by the Examiner

UNITED STATES PATENTS

| | | | |
|---|---|---|---|
| 1,743,533 | 1/1930 | Davis | 33—223 X |
| 2,084,561 | 6/1937 | Prescott et al. | 340—17 |
| 2,098,241 | 11/1937 | Hegenberger et al. | 33—223 |
| 2,153,565 | 4/1939 | Isaacson | 33—223 |
| 2,623,083 | 12/1952 | Schlumberger et al. | 73—430 X |

CLAUDE A. LE ROY, *Primary Examiner.*

CHANCELLOR E. HARRIS, *Examiner.*

F. DOMOTOR, *Assistant Examiner.*